US006637804B1

(12) United States Patent
Crean (10) Patent No.: US 6,637,804 B1
(45) Date of Patent: Oct. 28, 2003

(54) RECREATIONAL VEHICLE WITH WALK THROUGH SLIDE OUT (75) Inventor: Johnnie R. Crean, Chino, CA (US)

(73) Assignee: Alfa Leisure, Inc., Chino, CA (US)

( * ) Notice: Subject to any disclaimer, the term of this patent is extended or adjusted under 35 U.S.C. 154(b) by 0 days.

(21) Appl. No.: 10/020,509

(22) Filed: Oct. 30, 2001

(51) Int. Cl.[7] .................................................. B60P 3/34
(52) U.S. Cl. ...................... 296/176; 296/165; 296/171; 296/175; 296/26.13; 296/24.1
(58) Field of Search ................................ 296/165, 168, 296/171, 172, 175, 176, 26.01, 26.12, 26.13, 24.1

(56) References Cited

U.S. PATENT DOCUMENTS

| 1,536,518 A | 5/1925 | Osborn |
| 2,150,615 A | 3/1939 | Sword |
| 2,177,394 A | 10/1939 | Pierce |
| 2,225,319 A | 12/1940 | Rollo |
| 2,606,057 A | 8/1952 | Johnson |
| 2,639,187 A | 5/1953 | Grumbache |
| 2,704,223 A | 3/1955 | Houdart |
| 2,788,791 A | 4/1957 | Pospisil et al. |
| 2,876,035 A | 3/1959 | Houdart |
| 3,106,750 A | 10/1963 | Jarman |
| 3,165,350 A | 1/1965 | Willson |
| 3,254,914 A | 6/1966 | Steck |
| 3,287,058 A | 11/1966 | Wells |
| 3,300,839 A | 1/1967 | Lichti |
| 3,341,986 A | 9/1967 | Brosig |
| 3,565,480 A | 2/1971 | McCollum et al. |
| 3,572,809 A | 3/1971 | Buland |
| 3,608,954 A | 9/1971 | Lynd |
| 3,719,386 A | 3/1973 | Puckett et al. |
| 3,735,998 A | 5/1973 | Green |
| 3,740,088 A | 6/1973 | Ratcliff |
| 3,801,138 A | 4/1974 | Quick |
| 3,825,281 A | 7/1974 | Howard |
| 3,850,470 A | 11/1974 | Trelle |
| 3,887,220 A | 6/1975 | Hall |
| 3,895,726 A | 7/1975 | Rassieur |
| 3,902,752 A | 9/1975 | Pelletier |
| 3,915,492 A | 10/1975 | Agnese |

(List continued on next page.)

FOREIGN PATENT DOCUMENTS

| CH | 353262 | 9/1957 |
| DE | 42 04 640 A | 8/1993 |
| GB | 616274 | 1/1949 |
| GB | 2088789 | 11/1980 |
| GB | 2 260 951 | 5/1993 |
| IT | 478931 | 5/1951 |

OTHER PUBLICATIONS

Carefre, the World's Greatest Selection of RV Awnings, Sidewinder II, vol. 8, Issue 1, p. 19, 1997.
Brochure: Ideal from Alfa, 11/96.

*Primary Examiner*—D. Glenn Dayoan
*Assistant Examiner*—Patricia Engle
(74) *Attorney, Agent, or Firm*—Knobbe, Martens, Olson & Bear, LLP (57) ABSTRACT

A recreational vehicle having an expandable room, wherein the expandable room may be positioned in either a retracted or deployed configuration. In the deployed configuration, the room expands outwardly from the main housing of the vehicle so as to enlarge the overall living space area of the main housing. In the retracted configuration, the room slides inwardly into the main housing of the vehicle so as to reduce the width of the vehicle. The expandable room is equipped with at least one additional door on an outer wall in a manner so as to allow access to other rooms when expandable room is in the retracted configuration. The room may be extended in conjunction with an exterior slide-out assembly, wherein the deployed slide-out assembly produces a larger inner living space so as to accommodate the expanded room.

39 Claims, 8 Drawing Sheets

U.S. PATENT DOCUMENTS

| | | |
|---|---|---|
| 3,918,510 A | 11/1975 | Hayward |
| 3,959,985 A | 6/1976 | Schulze, Sr. |
| 4,014,586 A | 3/1977 | Swofford |
| 4,106,732 A | 8/1978 | Whiting |
| 4,108,326 A | 8/1978 | Bertolini |
| 4,109,954 A | 8/1978 | Wall |
| 4,147,379 A | 4/1979 | Winslow |
| 4,175,576 A | 11/1979 | Iby |
| 4,322,108 A | 3/1982 | McPherson |
| 4,457,554 A | 7/1984 | Fuisz et al. |
| 4,468,823 A | 9/1984 | Tounjian |
| 4,480,866 A | 11/1984 | Komatsu |
| 4,500,132 A | 2/1985 | Yoder |
| 4,550,946 A | 11/1985 | Hanemaayer |
| 4,589,463 A | 5/1986 | Ryan |
| RE32,262 E | 10/1986 | Stewart |
| 4,652,041 A | 3/1987 | Barber et al. |
| 4,653,125 A | 3/1987 | Porter |
| 4,719,954 A | 1/1988 | Curtis et al. |
| 4,728,144 A | 3/1988 | Crean |
| 4,729,594 A | 3/1988 | Hoff |
| 4,746,164 A | 5/1988 | Crean |
| 4,772,063 A | 9/1988 | Amy |
| 4,776,631 A | 10/1988 | Sargent et al. |
| 4,841,897 A | 6/1989 | Claflin |
| 4,867,502 A | 9/1989 | Sylvester et al. |
| 4,955,661 A | 9/1990 | Mattice |
| 4,957,323 A | 9/1990 | Johnson |
| 4,960,299 A | 10/1990 | Steadman |
| 4,971,355 A | 11/1990 | Studdard |
| 4,974,899 A | 12/1990 | Sargent |
| 5,028,072 A | 7/1991 | Lindsay |
| 5,061,001 A | 10/1991 | Madden et al. |
| 5,090,749 A | 2/1992 | Lee |
| 5,100,196 A | 3/1992 | Dodgen |
| 5,100,716 A | 3/1992 | Juneau |
| 5,112,082 A | 5/1992 | Clelland |
| 5,143,418 A | 9/1992 | Fouquet |
| 5,171,056 A | 12/1992 | Faludy et al. |
| 5,199,120 A | 4/1993 | Holmes |
| 5,237,782 A | 8/1993 | Cooper |
| 5,242,185 A | 9/1993 | Carr et al. |
| 5,248,005 A | 9/1993 | Mochizuki |
| 5,280,990 A | 1/1994 | Rinard |
| 5,291,701 A | 3/1994 | Delacollete et al. |
| 5,358,298 A | 10/1994 | Fate |
| 5,374,094 A | 12/1994 | Smith et al. |
| 5,401,050 A | 3/1995 | Baker |
| 5,403,063 A | 4/1995 | Sjostedt et al. |
| 5,419,607 A | 5/1995 | Oliveira |
| 5,516,182 A | 5/1996 | Aragon et al. |
| 5,529,825 A | 6/1996 | Sutherland |
| 5,560,444 A | 10/1996 | Tiedge |
| 5,566,918 A | 10/1996 | Becker |
| 5,620,224 A | 4/1997 | DiBiagio et al. |
| 5,634,683 A | 6/1997 | Young |
| 5,658,031 A | 8/1997 | DiBiagio et al. |
| 5,658,032 A | 8/1997 | Gardner |
| 5,673,962 A | 10/1997 | Maieli et al. |
| 5,706,616 A | 1/1998 | Fernandez |
| 5,718,253 A | 2/1998 | McNamee |
| 5,734,336 A | 3/1998 | Smithline |
| 5,746,473 A | 5/1998 | Crean |
| 5,785,373 A | 7/1998 | Futrell et al. |
| 5,788,306 A | 8/1998 | DiBiagio et al. |
| 5,791,715 A | 8/1998 | Nebel |
| 5,791,726 A | 8/1998 | Kaufman |
| 5,800,002 A | 9/1998 | Tiedge et al. |
| 5,833,294 A | 11/1998 | Williams et al. |
| 5,894,698 A | 4/1999 | Dewald, Jr. et al. |
| 5,902,001 A | 5/1999 | Schneider |
| 5,915,774 A | 6/1999 | Tiedge |
| 5,934,026 A | 8/1999 | Green |
| 5,940,012 A | 8/1999 | Studebaker |
| 5,951,082 A | 9/1999 | DiBiagio et al. |
| 5,983,576 A | 11/1999 | Hanser et al. |
| 6,007,142 A | 12/1999 | Gehman et al. |
| 6,098,346 A | 8/2000 | Miller et al. |
| 6,158,794 A | 12/2000 | Flanagan |
| 6,170,903 B1 | 1/2001 | Crean |
| 6,231,115 B1 | 5/2001 | Crean |
| 6,260,909 B1 | 7/2001 | Crean et al. |
| RE37,351 E | 9/2001 | Crean |
| 6,293,612 B1 | 9/2001 | Crean |

RECREATIONAL VEHICLE WITH WALK THROUGH SLIDE OUT

BACKGROUND OF THE INVENTION

1. Field of the Invention

The present invention relates to recreational vehicles and, in particular, relates to motorhomes and travel trailers that are adapted to expand in size so as to increase the effective interior living space of the vehicle.

2. Description of the Related Art

Recreational vehicles are becoming increasingly popular with people who wish to retain the comforts and conveniences of home while spending extended periods of time away from home at remote locations. In more elaborate configurations, the recreational vehicle typically includes amenities such as a bedroom, a bathroom with a sink and a flushing toilet, a kitchen with a refrigerator, stove, and sink, and a generously sized living area with reclining chairs and an entertainment center. Furthermore, a recreational vehicle may be easily parked at a wide variety of locations so that users may enjoy the amenities of the vehicle at their favorite destination. Consequently, people who use recreational vehicles may usually be assured of a comfortable living environment at their preferred remote destination without having to rely on the availability of suitable hotels.

In response to consumer demand, manufacturers have developed increasingly larger recreational vehicles. However, a large recreational vehicle is often difficult to maneuver while driving or towing. For example, an oversized trailer is difficult to back into the bay or parking slot of a campsite. In addition, tall recreational vehicles may have a high center of gravity, which creates unstable maneuverability around turns and in poor weather conditions. A recreational vehicle that maximizes the interior living space when parked and minimizes exterior dimensions when in a traveling motion is preferred. As a result of decreased maneuverability, state and federal laws have limited exterior dimensions of recreational vehicles that may be transported on public roads, thereby seemingly limiting the living space within the recreational vehicle.

In particular, current regulations specify a maximum length, otherwise known as the maximum allowed length, of highway bound travel trailers to be no greater than 40 feet. Furthermore, current regulations specify a maximum width, otherwise known as the maximum allowed width, of highway bound travel trailers to be no greater than 8.5 feet. Thus, the recreational vehicle industry has devoted considerable resources to develop improved motorhomes and travel trailers that increase the effective interior living space of the recreational vehicle while maintaining the exterior dimensions in a manner that is consistent with the transportational size restrictions.

Consequently, manufacturers have developed recreational vehicles with one or more extendable structures, commonly referred to as slide-outs, that provide the user with a supplemental living space when the vehicle is parked in a suitable location. In particular, the extendable structure is adapted to extend into a deployed configuration during the time that the vehicle is parked so that the interior living space within the recreational vehicle is increased by an amount which is substantially equal to the supplemental living space of the extendable structure. Furthermore, the extendable structure is adapted to retract into a retracted configuration during the time that the vehicle is in motion or towed so that the traveling dimensions of the recreational vehicle are within the maximum allowed length and width.

The typical extendable structure or slide-out is positioned within an opening of the housing of the recreational vehicle and is comprised of a plurality of walls that form the supplemental living space therein and an opening that provides access to the supplemental living space. In particular, the walls of the typical slide-out are comprised of a lower horizontal wall that forms a single level planar floor, which substantially aligns with an adjacent floor of the vehicle housing. In addition, the walls of the slide-out may further comprise an upper horizontal wall that forms either a single level planar ceiling, which may substantially align with an adjacent ceiling of the vehicle, or a step configuration, wherein the ceiling of the slide-out is dimensionally lower than the ceiling of the adjacent ceiling of the vehicle. Furthermore, the extendable structure or slide-out may also comprise an outer vertical wall that is adapted to align with an outer wall of the motorhome or travel trailer, when the slide-out is placed in the retracted configuration. In addition, a pair of horizontal side walls may be utilized to join the upper and lower horizontal walls and the outer vertical wall together.

Such an extendable structure, when in the retracted configuration, is positioned so that the outer vertical wall aligns with the side wall of the recreational vehicle and so that the remaining walls, including the lower horizontal wall, of the extendable structure are positioned within the interior living space of the recreational vehicle. Consequently, in the retracted configuration, the housing of the vehicle forms a more aerodynamic shape having a width and length that are within the maximum allowed width and length for road travel.

In a deployed configuration, the extendable structure extends from the vehicle so that the walls of the extendable structure extend from the opening of the housing of the vehicle so as to align the opening of the extendable structure with the opening of the side wall of the vehicle. Consequently, the floor of the extendable structure extends through the opening of the housing so that the effective living area of the recreational vehicle is increased. Furthermore, the walls of the extendable structure effectively become exterior walls of the recreational vehicle so that the interior living space of the recreational vehicle is enlarged. In some circumstances, it is desirable for recreational vehicle manufacturers to further increase the living space of recreational vehicles to further meet the demands of consumers.

While extendable housings, such as slide outs, increase the livable space in the deployed configuration, other factors have limited the size of these extendable housings. In particular, the side walls of the extendable housing are typically positioned within the main housing when the extendable housing is in the retracted configuration. However, even when the recreational vehicle is travelling, users may wish to have access to different parts of the recreational vehicle.

For example, in motorhomes, it is generally desirable for the drivers and passengers to be able to access the facilities at the back of the motorhome while the motorhome is in the retracted configuration. The occupants may wish to use the bathroom or access the kitchen facilities even when the extendable housing is retracted. Generally, the main housing of the recreational vehicle defines a central passageway which in prior art recreational vehicles is unobstructed by the retractable housing to permit access to different areas of the recreational vehicle when the recreational vehicle is in the retracted configuration.

However, providing this unobstructed central passageways usually results in the side walls of the extendable housing being limited in length as the side walls of the extendable housing usually extend normally to the central passageway. Consequently, the total livable space of the recreational vehicle when the extendable housing is in the deployed configuration is being limited by the desire to allow for unobstructed access between the various areas of the recreational vehicle when the housing is in the retracted configuration. Hence, there is a need for a recreational vehicle that allows for larger extendable housing while, at the same time, still permits relatively unobstructed access between various regions of the recreational vehicle when the extendable housing is in the retracted configuration.

SUMMARY OF THE INVENTION

The aforementioned needs are satisfied by the recreational vehicle of the present invention comprising a carriage assembly having a plurality of wheels and a plurality of outer walls mounted on the carriage assembly, wherein the plurality of outer walls define a main living space having a floor. Additionally, a plurality of inner walls may define at least one slide-out assembly having an inner living space, wherein the at least one slide-out assembly is deployed in a manner so as to increase the main living space by an amount at least as much as the area of the inner living space and retracted in a manner so as to reduce the main living space. Furthermore, at least one opening may be formed in at least one inner wall, wherein the at least one opening allows passage between the inner living space and the main living space when the at least one slide-out assembly is retracted. In one aspect, the recreational vehicle comprises a motorhome. In another aspect, the recreational vehicle comprises a trailer.

In one embodiment, the at least one opening is at least one doorway, wherein at least one door is mounted in the at least one doorway, and wherein the recreational vehicle further comprises a stair assembly, which is positioned adjacent to the at least one opening. In addition, the at least one opening may be formed in the at least one inner wall such that, when the at least one slide-out assembly is deployed, the at least one opening provides access between an exterior of the recreational vehicle and the inner living space.

In another embodiment, the plurality of outer walls may further define at least one area selected from the group consisting of a living area, a bedroom area, a bathroom area, a hallway area, a kitchen area, and a dining area. Moreover, the plurality of outer walls may also further define a central passageway that extends in a first direction interconnecting one or more areas, wherein the first direction comprises a horizontal axis that is parallel to the floor and extends from a front portion of the recreational vehicle to a rear portion of the recreational vehicle by an amount at least as much as the length of the recreational vehicle.

In still another embodiment, the at least one opening allows passage between the inner living space and the main living space via the central passageway when the at least one slide-out assembly is retracted. The slide-out assembly may include a first side wall that is dimensioned such that when the slide-out assembly is retracted, the first side wall is positioned across the central passageway such that the depth of the slide-out assembly is increased by an amount at least as much as the width of the central passageway. In one aspect, the slide-out assembly may include a first side wall and a second sidewall that are dimensioned such that when the slide-out assembly is retracted, the first and second side wall are positioned across the central passageway such that the depth of the slide-out assembly is increased by an amount at least as much as the width of the central passageway. In addition, the first opening may be formed in the first side wall and a second opening may be formed in the second side wall such that the first and second openings allow passage through the inner living space of the slide-out assembly from the main living space via the central passageway when the at least one slide-out assembly is retracted.

The aforementioned needs may also be satisfied by the recreational vehicle of the present invention comprising a carriage assembly having a plurality of wheels and a plurality of exterior walls mounted on the carriage assembly, wherein the plurality of exterior walls define an interior living space having a floor. In addition, a plurality of movable walls may be mounted within the carriage assembly so as to enclose a slide-out section, wherein the interior living space may be enlarged by sliding the plurality of movable walls from a retracted configuration into a deployed configuration. Moreover, at least one opening may be formed in at least one of the plurality of movable walls, wherein the one or more openings allow access to the slide-out section when the slide-out section is positioned in the retracted configuration, and wherein the one or more openings allow access to an exterior of the recreational vehicle when the slide-out section is positioned in the deployed configuration.

Furthermore, the aforementioned needs may also be satisfied by the recreational vehicle of the present invention comprising a carriage assembly having a plurality of wheels and a main housing which includes a plurality of main housing walls defining a main living space having a floor and a plurality of living space locations with a central passageway that extends in a first direction interconnecting the plurality of living spaces and wherein an opening is formed in one of the plurality of main housing walls.

Additionally, an extendable housing may be mounted within the opening in one of the plurality of main housing walls, wherein the extendable housing is movable in a direction substantially perpendicular to the first direction between an extended and a retracted position, wherein a doorway is formed in the extendable housing such that, when the extendable housing in the retracted position, the doorway is positioned adjacent the central passageway so as to permit user access between the plurality of living spaces via the central passageway and when the extendable housing is in the extended configuration, the doorway permits access to the exterior of the recreational vehicle. In one aspect, the extendable housing may include a first side wall that is dimensioned such that when the extendable housing is in the retracted configuration, the first side wall is positioned across the central passageway such that the depth of the extendable housing is increased by an amount at least as much as the width of the central passageway.

From the foregoing, it will be appreciated that the recreational vehicle with inner movable walls greatly increases the space within the otherwise fixed space rooms within the vehicle when the vehicle is in the deployed configuration. This greatly improves the livability of the recreational vehicle in that otherwise cramped spaces may be increased in size. The addition of a doorway to the movable walls of the deployed section improves access to the increased spaces when the movable walls are retracted. These and other objects and advantages of the present invention will become apparent from the following description taken in conjunction with the accompanying drawings.

DETAILED DESCRIPTION OF THE PREFERRED EMBODIMENT

Figure 1:
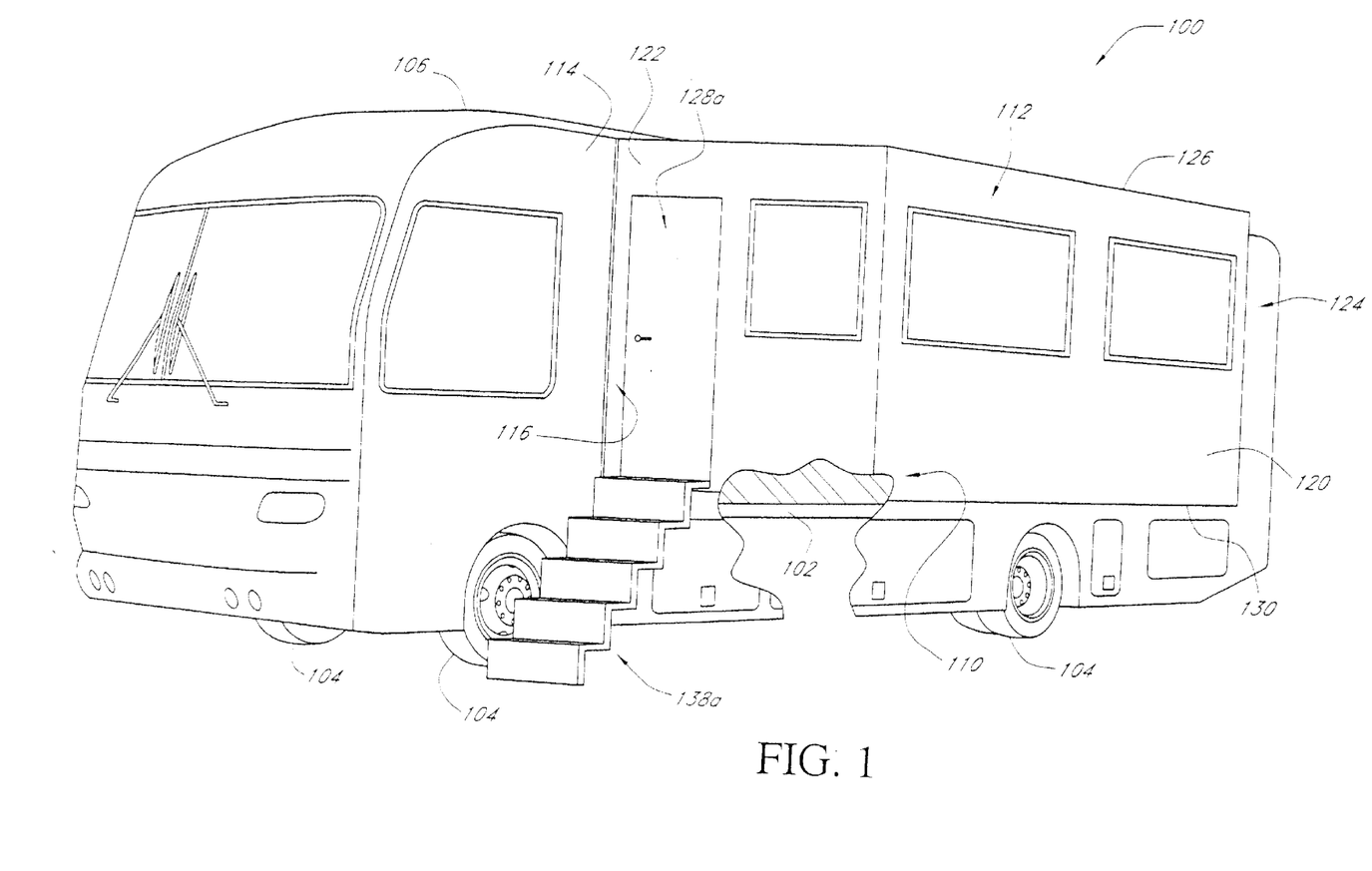
FIG. 1 illustrates a perspective view of a recreational vehicle comprising a motorhome with an exterior slide-out assembly in a deployed configuration.

References will now be made to the drawings wherein like numerals refer to like parts throughout. FIG. 1 illustrates one embodiment of a recreational vehicle (RV) 100 comprising a motorhome having a generally rectangular carriage assembly 102 attached to a plurality of wheels 104 so as to permit rolling movement of the motorhome 100 over the ground. FIG. 1 further illustrates a main housing 106 that is mounted above the carriage assembly 102 and is essentially formed of a plurality of planar walls that are joined together and mounted to the carriage assembly 102 in a generally known manner so as to define an inner living space 110 having a floor. A horizontal axis, which is parallel to the floor, extends in a first direction from the front portion of the RV 100 to the rear portion of the RV 100. One of the plurality of planar walls is a first fixed side wall 107 (shown in FIG. 2A, 2B) having a main entry door 108 (shown in FIG. 2A, 2B), which provides an RV user with a first point of entry into the RV 100. Furthermore, an exterior slide-out assembly 112, having at least One door 128a and at least one set of stairs 138a, is shown attached to another planar wall, which is a second fixed side wall 114 of the main housing 106. Additionally, the exterior slide-out assembly 112 extends outwardly from an exterior opening 116 of the main housing 106 in a deployed configuration.

The exterior slide-out assembly 112 may either be placed in the deployed configuration so as to effectively increase the inner living space 110 of the RV 100 or be placed in a retracted configuration so as to provide the RV 100 with a more suitable size and shape for traveling on a road. In particular, the exterior slide-out assembly 112 is formed of a plurality of walls that join together to form a supplemental living space therein as described in the Applicant's U.S. Pat. No. 6,293,612 entitled "RECREATIONAL VEHICLES WITH EXPANDABLE. ROOM" (Inventor: Johnnie. R. Crean), which is hereby incorporated by reference in its entirety. The plurality of walls include an outer vertical wall 120, a front lateral vertical wall 122, a rear lateral vertical wall 124, an overhead horizontal wall 126, and a lower horizontal wall 130 all of which are interconnected in a manner so as to form the slide-out assembly 112. Moreover, when joined together in a manner to form the slide-out assembly 112, the plurality of walls, as a collective, are movable so as to slide in and out of the main housing 106. When deployed, the slide-out assembly 112 increases the inner living space 110 by an amount at least as much as the effective area comprised by the slide-out assembly 112. In addition, the slide-out assembly 112 may be retracted in a manner so as to reduce the effective area of the inner living space 110.

In one embodiment, the exterior slide-out assembly 112 is coupled to an actuator assembly that moves the slide-out 112 between the deployed configuration and the retracted configuration in a generally known manner. In one aspect, the slide-out assembly 112 may be moved between the deployed configuration and the retracted configuration in a direction substantially perpendicular to the horizontal axis. Although this particular embodiment of FIG. 1 illustrates the exterior slide-out assembly 112 extending from the left side of the RV 100, it can be appreciated that the exterior slide-out assembly 112 may be adapted by one skilled in the art to extend from the right side of the RV 100 without departing from the scope of the present invention. Advantageously, the function of the slide-out assembly 112 may be utilized for increasing the living space within the recreational vehicle when the recreational vehicle is in a stationary position. Moreover, when the RV 100 is in a traveling motion, the slide-out 112 may be retracted to allow for a compact, retractable configuration of the RV 100 during travel.

A first opening may be formed in the front lateral vertical wall 122 in a manner generally known in the art, and a first door 128a may be mounted to the front lateral vertical wall 122 in a manner so as to swing outward and/or inward on a hinge assembly. In addition, a second opening may be formed in the rear lateral vertical wall 124, and a second door 128b (shown in FIG. 2A, 2B) may be mounted to the rear lateral vertical wall 124 in a similar manner. It should be appreciated that the slide-out assembly 112 may be equipped with one or more doors 128a, 128b having stairs 138a, 138b without departing from the scope of the present invention. Furthermore, the doors 128a, 128b are large enough to allow an average person to enter and/or exit the slide-out assembly 112 via doorways that surround the doors 128a, 128b.

Additionally, the stairs 138a, 138b may be positioned significantly adjacent a threshold of the at least one door 128a, which is located towards the lower section of the corresponding doorway. In one embodiment, the stairs 138a, 138b are equipped with the ability to retract in a folding manner so as to be hidden in a manner that allows the slide-out assembly 112 to safely retract into the retractable configuration as illustrated in FIG. 2B. In another embodiment, the stairs 138a, 138b are detachable in a manner so as to allow the slide-out assembly 112 to safely retract into the retractable configuration as illustrated in FIG. 2B.

One advantage to having the at least one door 128a positioned on the front and/or rear lateral vertical wall 122, 124 of the slide-out 112 is the addition of another point of entry into the RV 100. Advantageously, multiple points of entry increase convenience and flexibility of an RV. Due to limited interior wall space within an RV, a typical RV may often comprise only one point of entry. For that reason, the addition of another point of entry allows the RV user to enter or exit the RV on either side of the vehicle depending on a particular need. Further advantages to having the one or more doors 128a, 128b mounted on the slide-out assembly 112 will be discussed in greater detail herein below.

Figure 2A:
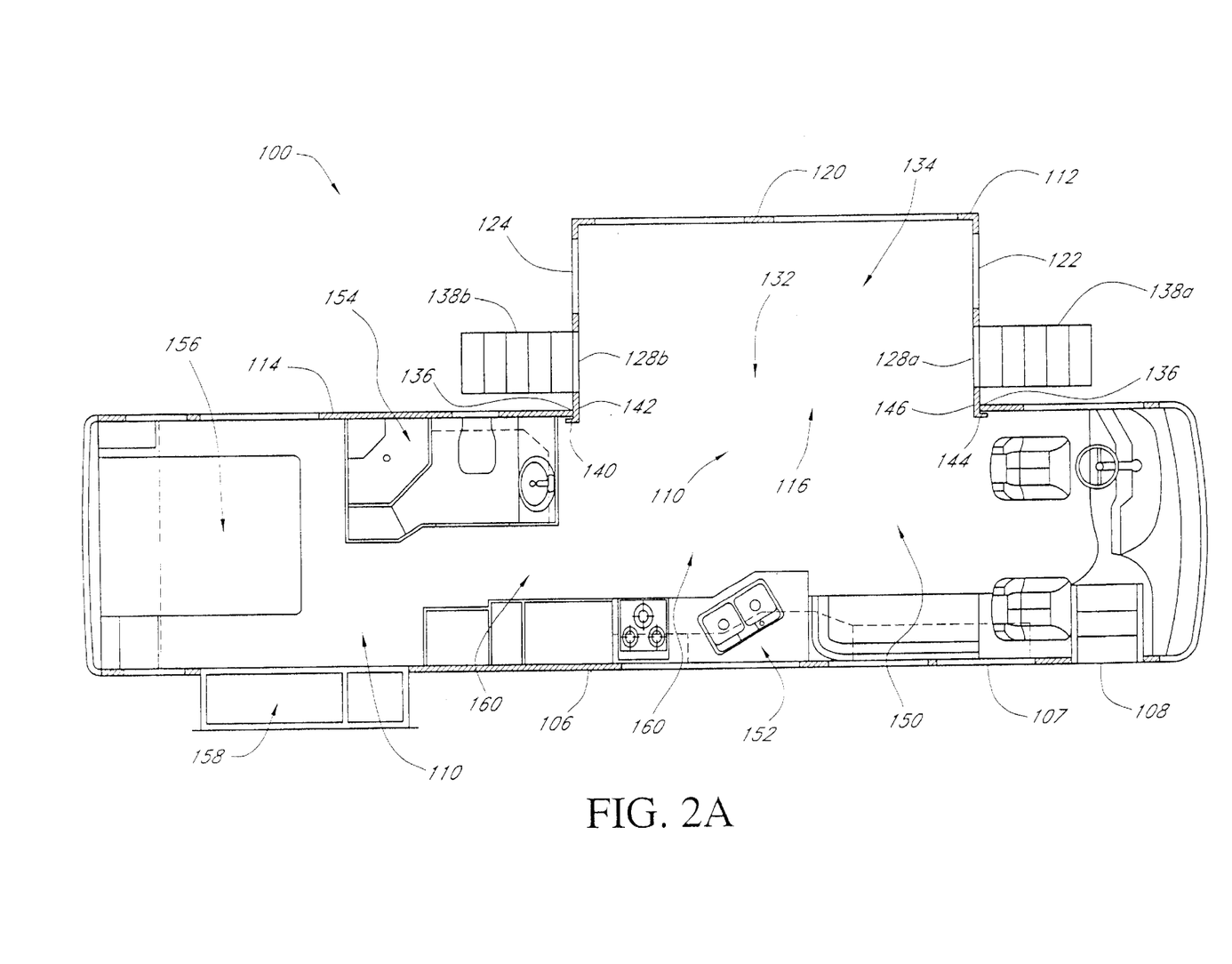
FIG. 2A illustrates an overhead plan view of the motorhome of FIG. 1 showing the exterior slide-out assembly in the deployed configuration.
Figure 2B:
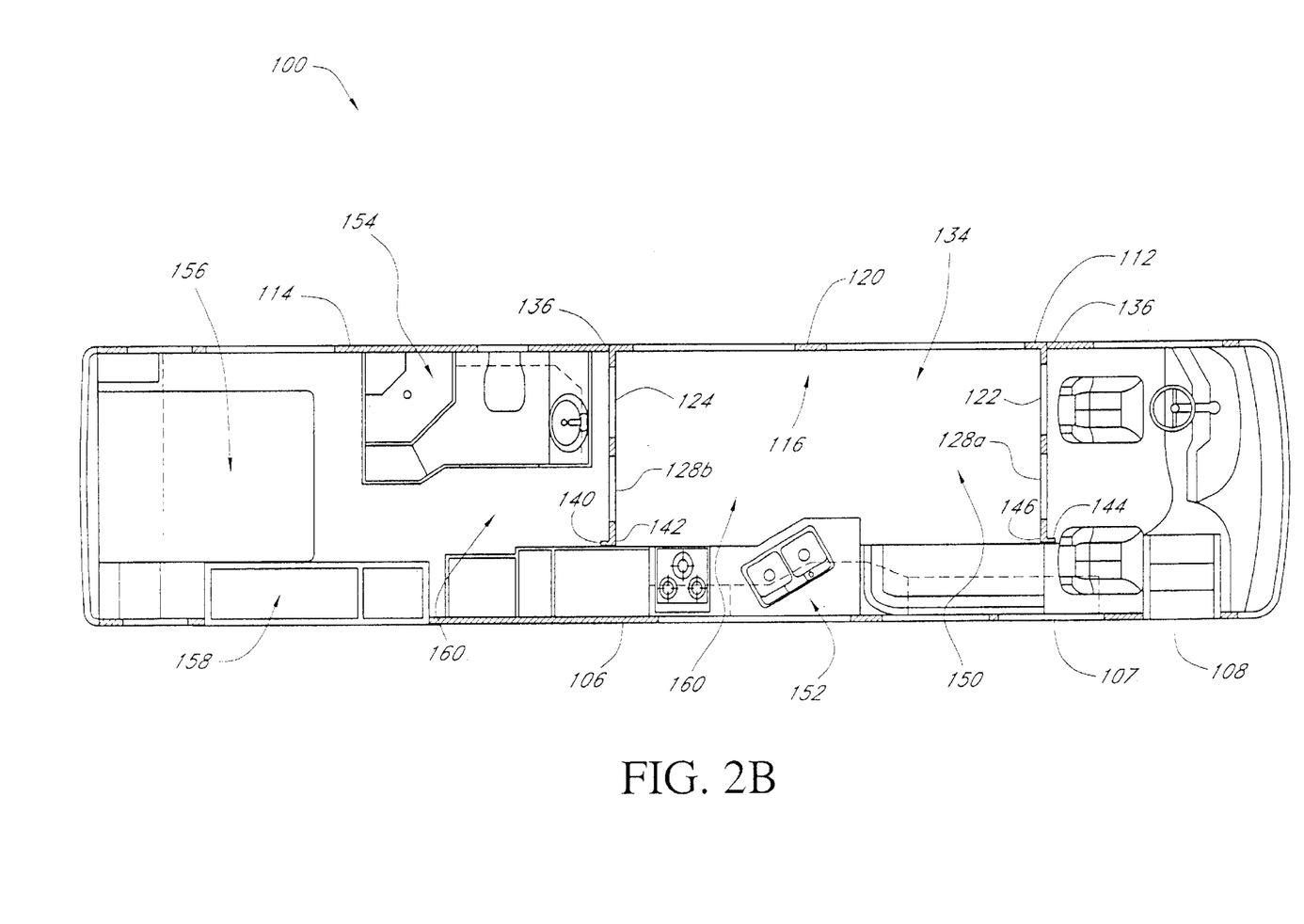
FIG. 2B illustrates an overhead plan view of the motorhome of FIG. 1 showing the exterior slide-out assembly in a retracted configuration.

Reference will now be made to FIGS. 2A and 2B, which provide a detailed plan view of the interior living space 110 within the motorhome 100 of FIG. 1. In particular, FIG. 2A illustrates the motorhome 100 of FIG. 1 with the exterior slide-out assembly 112 in the deployed configuration and FIG. 2B illustrates the motorhome 100 in FIG. 1 with the exterior slide-out assembly 112 in the retracted configuration. It will be appreciated that the layout of the interior living space 110 as illustrated herein is simply one illustrative embodiment and that a number of variations to this layout may be made by those skilled in the art without departing from the scope of the present invention.

As shown in FIG. 2A, the exterior slide-out assembly 112 is positioned in the deployed configuration and extends out of the exterior opening 116 of the first fixed side wall 114 of the main housing 106 so that an opening 132 of the slide-out assembly 112 aligns with the exterior opening 116 of the main housing 106. Thus, the supplemental living space 134 provided by the deployed exterior slide-out assembly 112 combines with the living space 110 of the main housing 106 to form an expanded living space of the motorhome 100. FIG. 2A further illustrates the addition of doors 128a, 128b and stairs 138a, 138b to the front and rear lateral vertical walls 122, 124 of the deployed slide-out assembly 112. Advantages to having the doors 128a, 128b mounted on the slide-out assembly 112 will be discussed in greater detail herein below. Furthermore, although the illustrated embodiment shows the exterior slide-out assembly 112 spanning a portion of the length of the main housing 106, it should be appreciated that the slide-out assembly 112 may be a variety of other suitable lengths depending on the particular application.

As shown in FIG. 2B, the exterior slide-out assembly 112 is positioned in the retracted configuration and retracts into the main housing 106 so that the slide-out assembly 112 is substantially positioned within the living space 110 of the motorhome 100. Consequently, the outer vertical wall 120 of the exterior slide-out assembly 112 is aligned with the exterior opening 116 of the main housing 106 so as to form the motorhome 100 with a more aerodynamic shape and so as to reduce the effective width of the motorhome 100 while the vehicle is in a traveling motion. FIG. 2B further illustrates the doors 128a, 128b to the front and rear lateral vertical walls 122, 124 of the retracted slide-out assembly 112. When the slide-out 112 is retracted, the stairs 138a, 138b are also retracted or detached in a manner so as to not restrict the sliding movement of the slide-out 112 during the physical actuation of the deployment and retraction configuration.

FIGS. 2A and 2B further illustrate a first lip 140 that is formed along a first edge 142 of the rear lateral vertical wall 124, wherein the first lip 140 extends orthogonally from the outer surface of a rear lateral vertical wall 124. Similarly, a second lip 144 is formed along a first edge 146 of the front lateral vertical wall 122, wherein the second lip 144 extends orthogonally from an outer surface of the front lateral vertical wall 122. Additionally, a stop edge 136 is formed on the second fixed wall 114 of the main housing 106, wherein the stop edge 136 is positioned around the perimeter of the exterior opening 116. As illustrated in FIG. 2A, the stop edge 136 on the second fixed wall 114 forms a stop against which the first and second lips 140, 144 on the front and rear lateral vertical walls 122, 124 engage when the walls 122, 124 are slidably moved into the deployed configuration shown in FIG. 2A. As, illustrated in FIG. 2B, the slide-out assembly 112 retracts in a significantly flush manner so as to form a environmental seal at the point where the outer vertical wall 120 is significantly adjacent to the stop edge 136, which is positioned around the perimeter of the exterior opening 1116 formed on the first fixed side wall 114 of the main housing 106. Moreover, the retracted configuration of the slide-out 112 allows for a Compact, retractable configuration of the RV during travel.

Additionally, the living space 110 of the motorhome 100, as shown in FIGS. 2A and 2B, may be sub-divided into living spaces including a living room space 150, a kitchen space 152, a bathroom space 154, a bedroom space 156, a wardrobe space 158, and a central passageway 160 as described in the Applicant's U.S. Pat. No. 6,293,612 entitled "RECREATIONAL VEHICLES WITH EXPANDABLE ROOM" (Inventor: Johnnie R. Crean). As is generally known in the art, the front portion of the RV 100 also serves as a riding and/or driving area for the driver and passengers when the motorhome is in a travelling motion. In one embodiment, the wardrobe space 158 may be configured to deploy and retract in a similar manner as the slide-out assembly 112 when the RV 100 is in a stationary position. In addition the central passageway 160 may be positioned parallel to the horizontal axis and extend the length of the RV 100 from the front portion of the RV 100 to the rear portion of the RV 100 so as to allow an RV user unrestricted access to the various living spaces 150, 152, 154, 156, 158 within the RV 100 when the slide-out assembly 112 is in the deployed configuration. In one aspect, the central passageway 160 interconnects the interior living spaces 150, 152, 154, 156, 158.

Moreover, generally known furniture, fixtures, and appliances relative to particular living spaces 150, 152, 154, 156, 158 are typically positioned against either the outer vertical walls of the exterior slide-out assembly 112 and/or the outer vertical walls of the main housing 106 so that a sufficiently wide central passageway 160 may be created between the various furniture, fixtures, and appliances occupying the living space 110. Preferably, the central passageway 160 extends generally along the longitudinal axis of the main housing 106 and may be widened when the exterior slide-out assembly 112 is in a deployed configuration as shown in FIG. 2A. Advantageously, a wider central passageway 160 may be created when the exterior slide-out assembly 112 extends in the deployed configuration from the main housing 106 so that the furniture, fixtures, and appliances placed against the outer vertical walls of the slide-out assembly 112 move outwardly away from the central passageway 160 so as to widen the central passageway 160 when the slide-out 112 is in the deployed configuration.

Figure 2C:
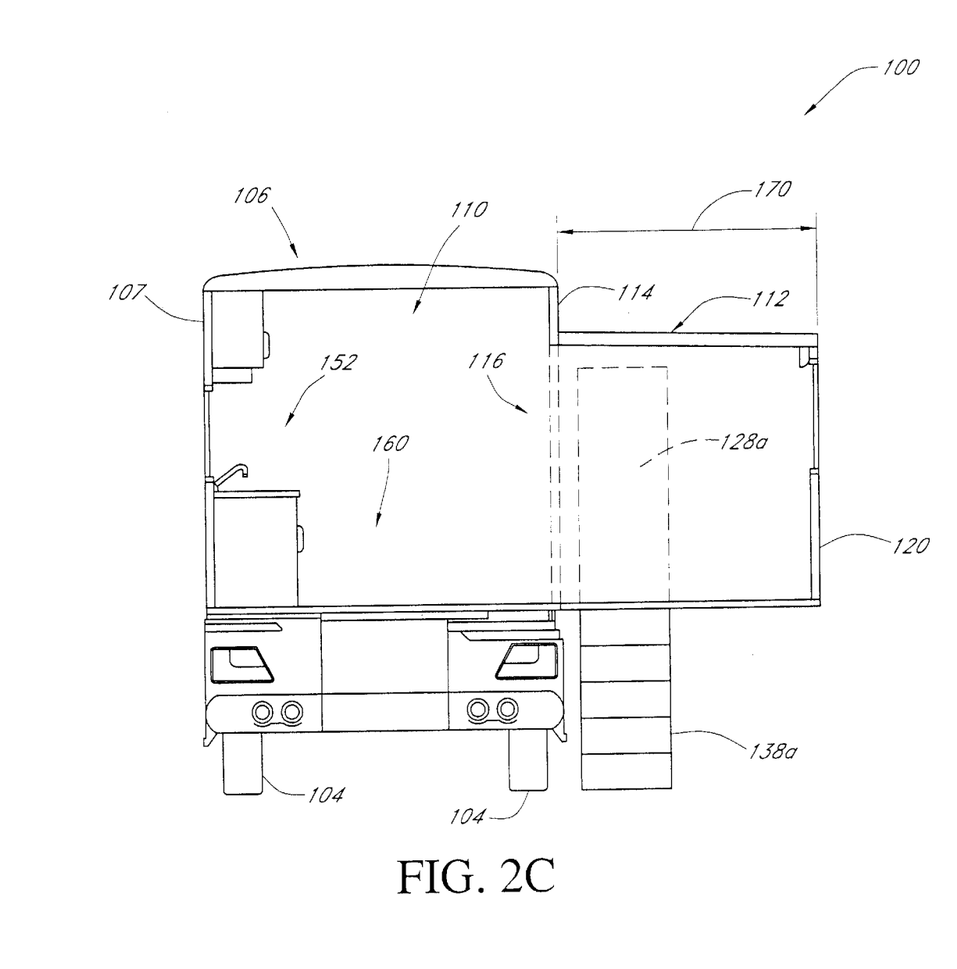
FIG. 2C illustrates a cross-sectional view of the motorhome of FIG. 1 showing the exterior slide-out assembly in the deployed configuration.
Figure 2D:
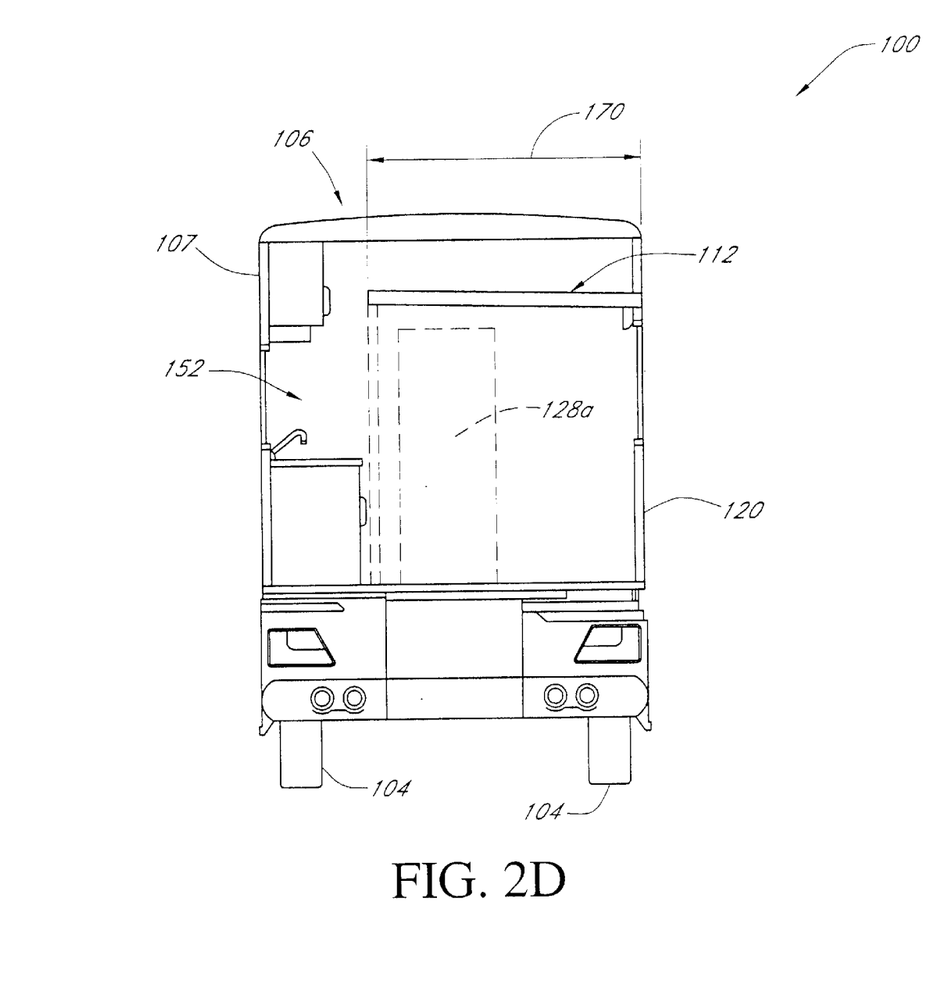
FIG. 2D illustrates a cross-sectional view of the motorhome of FIG. 1 showing the exterior slide-out assembly in a retracted configuration.

FIG. 2C illustrates a cross-sectional view of the motorhome 100 of FIG. 1 showing the exterior slide-out assembly 112 in the deployed configuration, and FIG. 2D illustrates a cross-sectional view of the motorhome of FIG. 1 showing the exterior slide-out assembly 112 in a retracted configuration. In one aspect, to meet the demand of consumers for more interior living space within RVs, the RV 100 may be equipped with a larger slide-out assembly 112. A width 170 of the slide-out assembly 112 may be enlarged to increase the amount of effective living space within the RV 100, when the slide-out assembly 112 is in the deployed configuration as illustrated in FIG. 2C. In addition, the larger slide-out assembly 112 may require longer front and rear lateral vertical walls 122, 124 to support the increased depth of the slide-out assembly 112. In one embodiment, the slide-out assembly 112 is positioned across the central passageway 160 such that the depth of the slide-out assembly 112 is increased by an amount at least as much as the width of the central passageway 160. Unfortunately, when the larger slide-out assembly 112 is in the retracted configuration as illustrated in FIG. 2D, the longer front and rear lateral vertical walls 122, 124 may block the central passageway 160 and restrict access to the various living spaces 150, 152, 154, 156, 158 within the living space 110 of the RV 100.

In other words, the longer walls 122, 124 of the larger slide-out assembly 112 may obstruct the path between the front portion and the rear portion of the recreational vehicle as illustrated in FIGS. 2B, 2D. Longer walls 122, 124 may restrict access for an RV user to conveniently move between various points of the interior living space 110 located within the recreational vehicle 100 due to the obstructive walls 122, 124 of the larger retracted slide-out assembly 112. With the addition of doors 128a, 128b to the longer walls 122, 124 of the larger slide-out assembly 112, the longer walls 122, 124 no longer block or restrict access to the various living spaces 150, 152, 154, 156, 158 when the larger slide-out assembly 112 is in the retracted configuration.

Advantageously, an RV user may easily, conveniently, and safely pass through the doorways of the doors 128a, 128b to access the various living spaces 150, 152, 154, 156, 158 when the RV 100 is in a traveling motion. In addition, it may also be advantageous under certain circumstances for an RV user to have access to the various living spaces 150, 152, 154, 156, 158 within the RV 100 when the vehicle 100 is in a parked or stationary position. As a result, the addition of the doors 128a, 128b also adds convenience and flexibility in this respect. For example, when the RV 100 is in a travelling motion, the slide-out assembly 112 is retracted to provide a more aerodynamic shape and better maneuverability during travel. In most traveling situations, an RV occupant or passenger is free to move about the living space 110 during travel. By expanding the slide-out assembly 112 to a larger format, the walls 122, 124 of the retracted slide-out assembly 112 may enclose or cut-off the front and/or back portion of the RV 100 from access and inhibit entry into the various living spaces 150, 152, 154, 156, 158 within the RV 100. Therefore, it would be advantageous to add doors 128a, 128b to the walls 122, 124 of the larger slide-out assembly 112, which allows access to the various living spaces 150, 152, 154, 156, 158 within the RV 100 when the vehicle 100 is in a traveling motion or parked in a stationary position.

Figure 3:
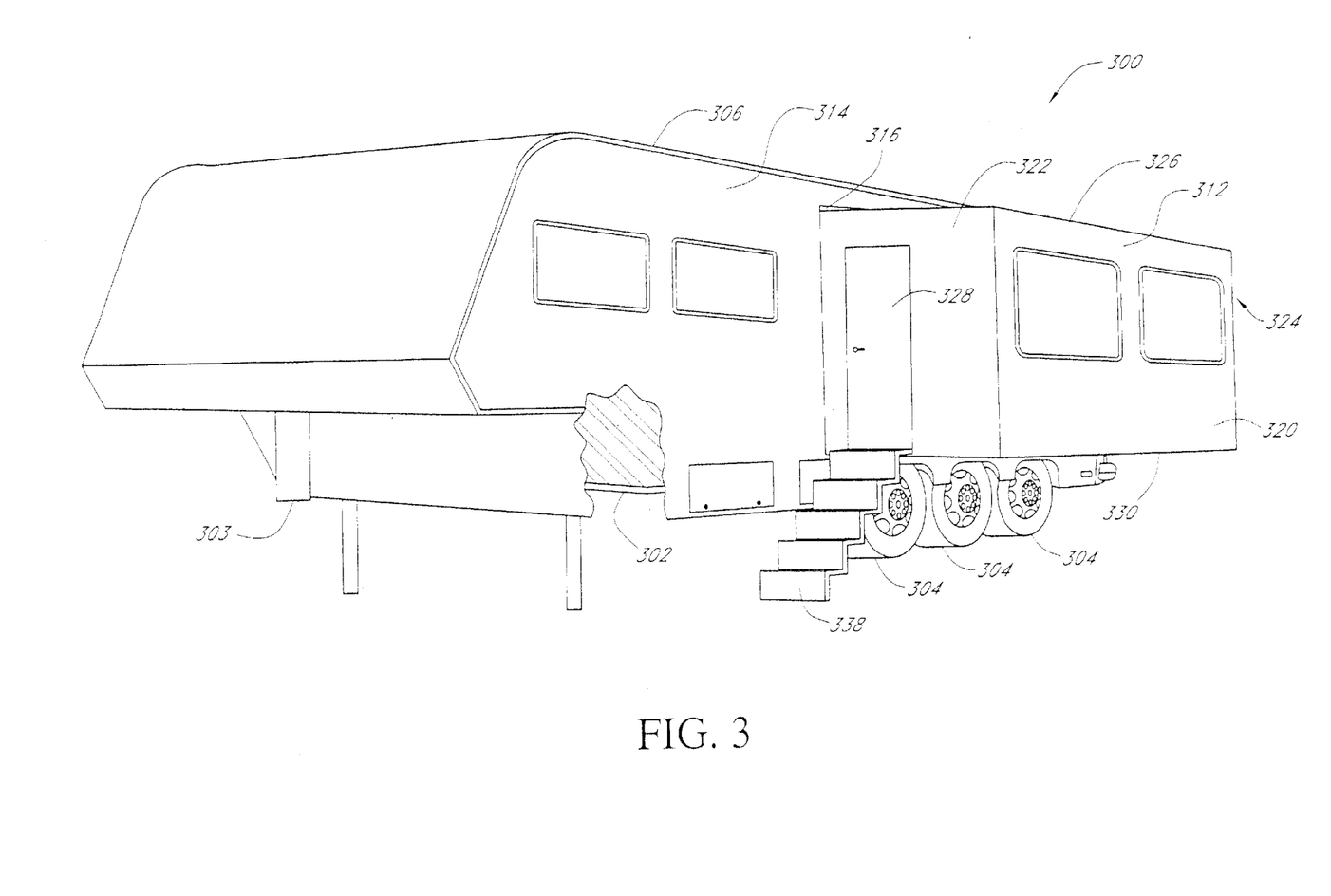
FIG. 3 illustrates a perspective view a recreational vehicle comprising a trailer with an exterior slide-out assembly in a deployed configuration.

FIG. 3 illustrates another embodiment of a recreational vehicle (RV) 300 comprising a travel trailer having a multiple level, generally rectangular carriage assembly 302 attached to a plurality of wheels 304 so as to permit rolling movement of the trailer 300 over the ground. FIG. 3 further illustrates a male hitch assembly 303, which is shown at the front portion of the trailer 300 and is designed to couple with a known female hitch assembly of a towing vehicle so that the trailer 300 may be towed by a towing vehicle. Additionally, a main housing 306 is mounted above the carriage assembly 302 and is formed by interconnecting a plurality of planar walls that are joined together and mounted to the carriage assembly 302 in a generally known manner so as to define an inner living space 310 (shown in FIGS. 4A, 4B) having, in one embodiment, multiple level floors. One of the plurality of planar walls is a first fixed side wall 307 (shown in FIGS. 4A, 4B) having a main entry door 308 (shown in FIGS. 4A, 4B), which provides an RV user a first point of entry into the RV 300.

Similar to the RV 100 illustrated in FIG. 1, FIG. 3 further illustrates the RV 300 comprising a slide-out assembly 312 having a plurality of walls. The plurality of walls include an outer vertical wall 320, a front lateral vertical wall 322, and rear lateral vertical wall 324, an overhead horizontal wall 326, and a lower horizontal wall 330 all of which are interconnected in a manner so as to form the slide-out assembly 312. Furthermore, when joined together in a manner to form the slide-out assembly 312, the plurality of walls, as a collective, are movable so as to slide in and out of the main housing 106. Furthermore, the slide-out assembly 312 is shown attached to another planar wall, which is a second fixed side wall 314 of the main housing 306. The slide-out assembly 312 comprises at least one door 328 and at least one set of stairs 338, wherein the least one door 328 is mounted to the front lateral vertical wall 122 in a manner so as to swing outward and/or inward on a hinge assembly. In addition, the slide-out assembly 312 extends outwardly from an opening 316 of the main housing 306 in a deployed configuration. It should be appreciated that the functionality of the slide-out assembly 312, the door 328, and the stairs 338 in FIG. 3 is similar in scope to the corresponding components of the RV 100 as illustrated in FIG. 1.

Figure 4A:
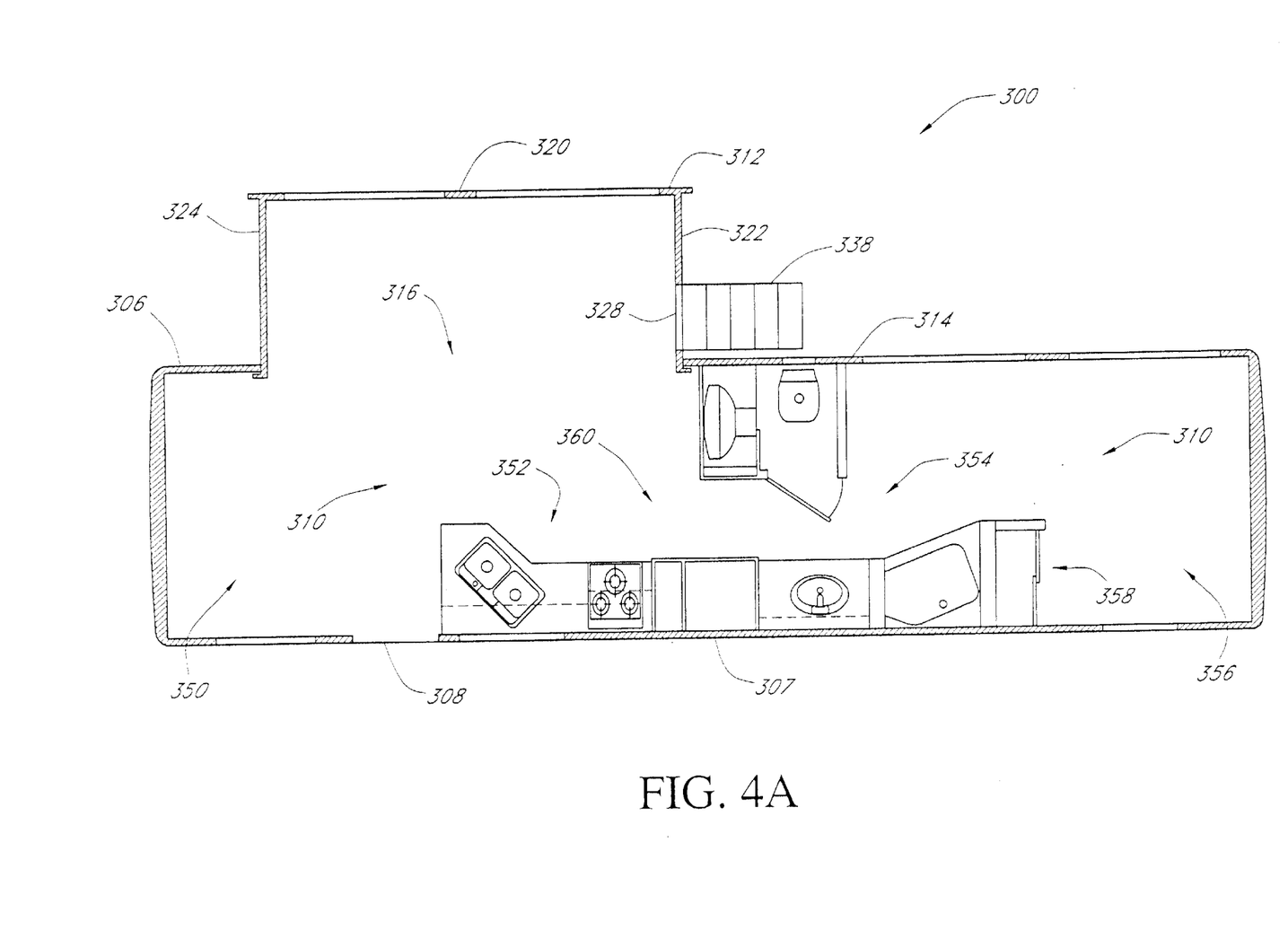
FIG. 4A illustrates an overhead plan view of the trailer of FIG. 3 showing the exterior slide-out assembly in a deployed configuration.
Figure 4B:
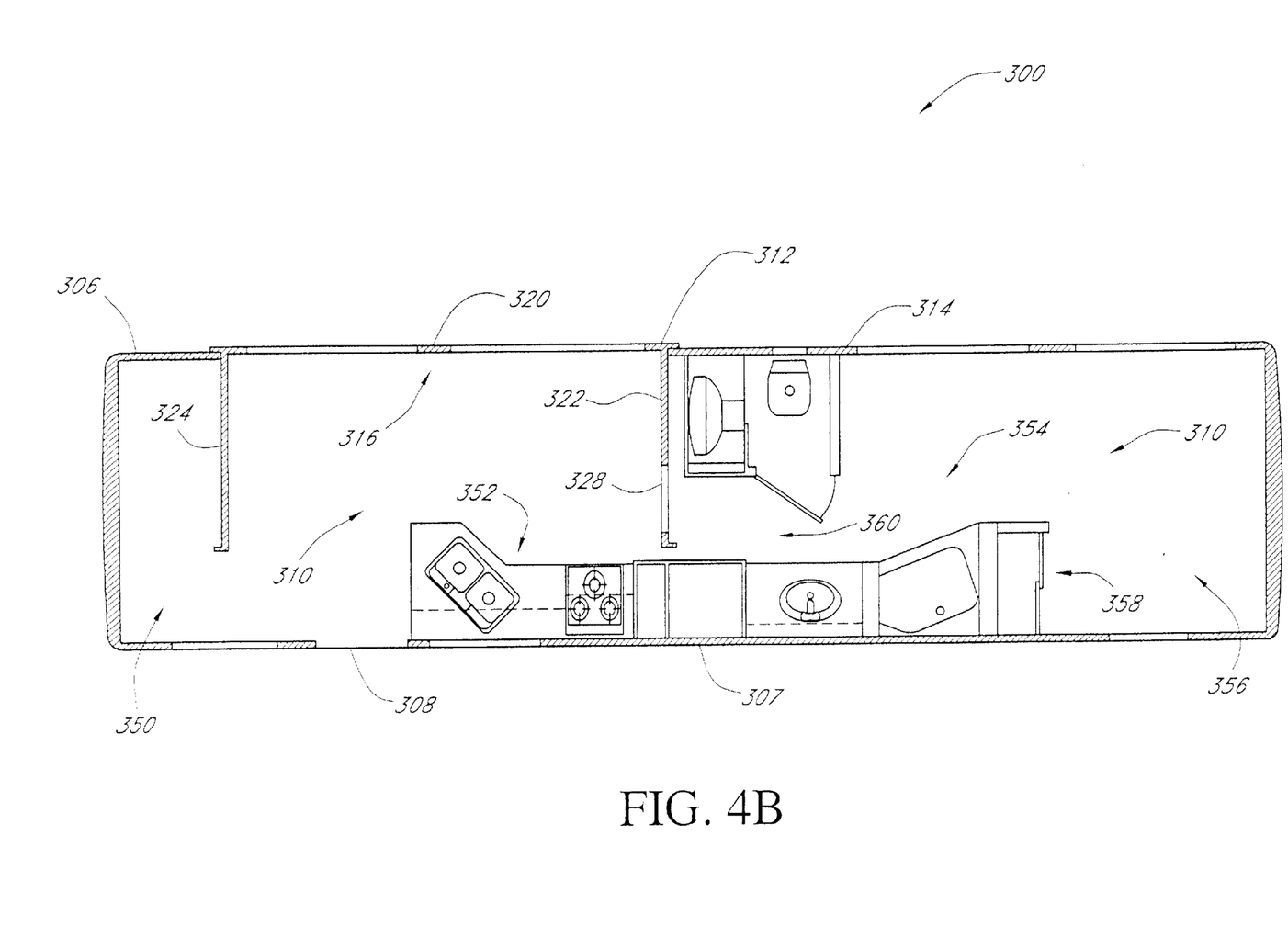
FIG. 4B illustrates an overhead plan view of the trailer of FIG. 3 showing the exterior slide-out assembly in a retracted configuration.

Corresponding to the FIGS. 2A, 2B, the FIGS. 4A, 4B illustrate a similar detailed floor plan of the living space 310 within the trailer 300 of FIG. 3. In particular, FIG. 4A illustrates the trailer 300 with the exterior slide-out assembly 312 in the deployed configuration and FIG. 4B illustrates the trailer 300 with the exterior slide-out assembly 312 in the retracted configuration. In one aspect, the living space layout 110, 310 of the motorhome 100 and the trailer 300 will be assumed to be generally the same except for the orientation of the layout. Specifically, in this particular embodiment, the front portion of the motorhome layout 110 is the rear portion of the trailer layout 310 and vice versa. Moreover, it should be appreciated that the exact layout of recreational vehicle floor plans may vary from the illustrated floor plans of FIGS. 2A, 2B, 4A, and 4B without departing from the scope of the present invention.

Similar to the illustrated living space 110 of RV 100, the living space 310 of the trailer RV 300, as shown in FIGS. 4A and 4B, may be sub-divided into living spaces including a living room space 350, a kitchen space 352, a bathroom space 354, a bedroom space 356, a wardrobe space 358, and a central passageway 360 as described in the Applicant's U.S. Pat. No. 6,293,612 "RECREATIONAL VEHICLES WITH EXPANDABLE ROOM" (Inventor: Johnnie R. Crean). Additionally, in one embodiment, the front slide-out 312 may include a two level extendable housing as described in the Applicant's U.S. Pat. No. 6,293,612 entitled "TRAVEL TRAILER WITH EXTENDABLE TWO LEVEL BATHROOM AND BEDROOM" (Inventor: Johnnie R. Crean), which is hereby incorporated by reference.

The advantages achieved with the addition of one or more doors 328 having stairs 338 to the slide-out assembly 312 of the trailer RV 300 is similar in scope to the advantages gained with the corresponding components of the motorhome RV 100. When the slide-out assembly 312 is in the deployed position the addition of one or more doors 328 add another point of entry into and out of the RV 300. Furthermore, when the slide-out assembly 312 is in the retracted position, the added one or more doors 328 allow access to various living spaces within the trailer RV 300.

Although the above-disclosed embodiments of the present invention have shown, described, and pointed out the fundamental novel features of the invention as applied to the above-disclosed embodiments, it should be understood that various omissions, substitutions, and changes in the form of the detail of the device illustrated may be made by those skilled in the art without departing from the spirit of the present invention. Consequently, the scope of the invention should not be limited to the foregoing description, but should be defined by the appended claims.

What is claimed is:

1. A recreational vehicle comprising:

a carriage assembly having a plurality of wheels;

a plurality of outer walls mounted on the carriage assembly, wherein the plurality of outer walls define a main living space having a front and rear section with a common floor; and a plurality of inner walls defining at least one slide-out assembly having an inner living space interposed between the front and rear sections of the main living space, wherein the at least one slide-out assembly may be deployed in a manner so as to increase the main living space by an amount at least as much as the area of the inner living space and retracted in a manner so as to reduce the main living space and block passage between the front and rear sections of the main living space, and wherein the plurality of inner walls comprise a front and rear inner wall each having an opening formed therein so as to allow passage between the front and rear sections of the main living space via the inner living space when the at least one slide-out assembly is retracted.

2. The vehicle of claim 1, wherein a plurality of openings are formed in at least one of the plurality of inner walls.

3. The vehicle of claim 1, wherein at least one of the openings in the front and rear inner walls is at least one doorway.

4. The vehicle of claim 3, wherein at least one door is mounted in the at least one doorway.

5. The vehicle of claim 1, wherein at least one of the openings is formed in at least one inner wall such that, when the at least one slide-out assembly is deployed, the at least one opening provides access between an exterior of the recreational vehicle and the inner living space.

6. The vehicle of claim 1, wherein the recreational vehicle further comprises a stair assembly, which is positioned adjacent to at least one of the openings.

7. The vehicle of claim 1, wherein the plurality of outer walls further define at least one area selected from the group consisting of a living area, a bedroom area, a bathroom area, a hallway area, a kitchen area and a dining area.

8. The vehicle of claim 1, wherein the plurality of outer walls further define a central passageway that extends in a first direction interconnecting the front and rear sections.

9. The vehicle of claim 8, wherein the first direction comprises a horizontal axis that is parallel to the floor and extends from the front section of the recreational vehicle to the rear section of the recreational vehicle.

10. The vehicle of claim 8, wherein at least one of the openings allows passage between the inner living space and the main living space via the central passageway when the at least one slide-out assembly is retracted.

11. The vehicle of claim 8, wherein at least one of the front and rear inner walls is dimensioned such that when the slide-out assembly is retracted, at least one of the front and rear inner walls is positioned substantially across the central passageway while still allowing passage between the front and rear sections.

12. The vehicle of claim 11, wherein the front and rear inner walls are dimensioned such that when the slide-out assembly is retracted, the front and rear inner walls are positioned across the central passageway.

13. The vehicle of claim 12, wherein the openings is formed in the front inner wall and rear inner wall are positioned such that the openings allow passage through the inner living space of the slide-out assembly from the main living space via the central passageway when the at least one slide-out assembly is retracted.

14. The vehicle of claim 1, wherein the recreational vehicle comprises a motorhome.

15. The vehicle of claim 1, wherein the recreational vehicle comprises a travel trailer.

16. A recreational vehicle comprising:

a carriage assembly having a plurality of wheels;

a plurality of exterior walls mounted on the carriage assembly, wherein the plurality of exterior walls define an interior living space having a floor, and wherein the interior living space is divided into a plurality of interior living spaces including front and rear interior living spaces;

a plurality of movable walls mounted within the carriage assembly so as to enclose a slide-out section between the front and rear interior living spaces, wherein the interior living space may be enlarged by sliding the plurality of movable walls from a retracted configuration into a deployed configuration; and at least two openings formed in the plurality of movable walls, wherein the openings allow access to the slide-out section from the front and rear interior living spaces when the slide-out section is positioned in the retracted configuration, and wherein the openings allow access to an exterior of the recreational vehicle when the slide-out section is positioned in the deployed configuration.

17. The vehicle of claim 16, wherein the openings comprise at least one doorway.

18. The vehicle of claim 17, wherein at least one door is mounted to the at least one doorway.

19. The vehicle of claim 16, wherein the recreational vehicle further comprises at least one stair assembly, which is positioned adjacent to at least one of the openings.

20. The vehicle of claim 16, wherein the plurality of exterior walls define at least one area selected from the group consisting of a living area, a bedroom area, a bathroom area, a hallway area, a kitchen area, and a dining area.

21. The vehicle of claim 16, wherein the plurality of exterior walls further define a central passageway that extends in a first direction interconnecting the front and rear interior living spaces.

22. The vehicle of claim 21, wherein the first direction comprises a horizontal axis that is parallel to the floor and extends a length from the front interior living space of the recreational vehicle to the rear interior living space of the recreational vehicle.

23. The vehicle of claim 21, wherein the openings allows passage between the front interior living space and the rear interior living space via the central passageway when the plurality of movable walls are in the retracted configuration.

24. The vehicle of claim 21, wherein the plurality of movable walls include a first side wall that is dimensioned such that when the plurality of movable walls are in the retracted configuration, the first side wall is positioned substantially across the central passageway while still allowing passage between the front and rear living spaces.

25. The vehicle of claim 24, wherein the plurality of movable walls include a first side wall and a second sidewall that are dimensioned such that when the plurality of movable walls are in the retracted configuration, the first and second side walls are positioned across the central passageway while still allowing passage between the front and rear living spaces.

26. The vehicle of claim 25, wherein a first opening is formed in the first side wall and a second opening is formed in the second wall such that the first and second openings allow passage through the slide-out section between the front and rear interior living spaces via the central passageway when the plurality of movable walls are in the retracted configuration.

27. The vehicle of claim 16, wherein the recreational vehicle comprises a motorhome.

28. The vehicle of claim 16, wherein the recreational vehicle comprises a travel trailer.

29. A recreational vehicle comprising:

a carriage assembly having a plurality of wheels;

a main housing which includes a plurality of main housing walls defining a main living space having a floor and a plurality of living space locations which define a front portion and a rear portion with a central passageway that extends from the front portion of the main housing to the rear portion of the main housing so as to interconnect the plurality of living spaces and wherein an opening is formed in one of the plurality of main housing walls; and an extendable housing that is mounted within the opening in one of the plurality of main housing walls so as to be interposed between the front and rear portions of the main housing, wherein the extendable housing is movable between an extended and a retracted position Herein a plurality of doorways are formed in the extendable housing such that, when the extendable housing is in the retracted position, the plurality of doorways are positioned adjacent the central passageway so as to permit user access between the front and rear portions of the recreational vehicle via the plurality of living spaces and the central passageway and, when the extendable housing is in the extended configuration, at least one of the doorways permit access to the exterior of the recreational vehicle.

30. The vehicle of claim 29, wherein the extendable housing includes a first side wall that is dimensioned such that when the extendable housing is in the retracted configuration, the first side wall is positioned across the central passageway while still allowing passage between the front and rear portions.

31. The vehicle of claim 29, wherein a door is mounted in at least ones of the doorways.

32. The vehicle of claim 29, wherein the recreational vehicle further comprises a stair assembly, which is positioned adjacent at least one of the doorways.

33. The vehicle of claim 32, wherein the recreational vehicle comprises a plurality of stair assemblies positioned adjacent the plurality of doorways.

34. The vehicle of claim 29, wherein the central passageway extends in a first direction comprising a horizontal axis that is parallel to the floor and extends a length from the front portion of the recreational vehicle to the rear portion of the recreational vehicle.

35. The vehicle of claim 29, wherein the plurality of main housing walls define at least one area selected from the group consisting of a living area, a bedroom area, a bathroom area, a hallway area, a kitchen area and a dining area.

36. The vehicle of claim 29, wherein the vehicle comprises a motorhome.

37. The vehicle of claim 29, wherein the vehicle comprises a travel trailer.

38. In a recreational vehicle including a carriage assembly having a pity of wheels, a plurality of outer walls mounted on the carriage assembly wherein the plurality of outer walls define a main living space having a front and rear section with a common floor and wherein the plurality of outer walls further define a central passageway that extends in a first direction interconnecting the front and rear sections, and a plurality of inner walls, including front and rear inner walls, defining at least one improved slide-out assembly having a depth defined by a longest length of the front and rear inner walls and having an inner living space interposed between the front and rear sections of the main living space wherein the at least one slide-out assembly may be deployed in a manner so as to increase the main living space by an amount at least as much as the area of the inner living space and retracted in a manner so as to reduce the main living space and block passage between the front and rear sections of the main living space, the improvement comprising that the front and rear inner wall each have an opening formed therein so as to allow passage between the front and rear sections of the main living space via the inner living space when the at least one slide-out assembly is retracted and wherein at least one of the front and rear inner walls is dimensioned such that when the slide-out assembly is retracted, at least one of the front and rear inner walls is positioned substantially across the central passageway such that the depth of the slide-out assembly is increased by an amount at least as much as the width of the central passageway while still allowing passage between the front and rear sections.

39. In the recreational vehicle of claim 38, further improvement comprising that the front and rear inner walls are dimensioned such that when the slide-out assembly is retracted, the front and rear inner walls are positioned across the central passageway wherein the openings formed in the front inner wall and rear inner wall are positioned such that the openings allow passage through the inner living space of the slide-out assembly from the main living space via the central passageway when the at least one slide-out assembly is retracted.

* * * * *